US012713268B2

(12) United States Patent
Esswie

(10) Patent No.: US 12,713,268 B2
(45) Date of Patent: Aug. 18, 2026

(54) USER EQUIPMENT ARTIFICIAL INTELLIGENCE DATA SET COMPILING AND REPORTING

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 441 days.

(21) Appl. No.: 18/451,383

(22) Filed: Aug. 17, 2023

(65) Prior Publication Data

US 2025/0063408 A1 Feb. 20, 2025

(51) Int. Cl.
*H04W 24/10* (2009.01)

(52) U.S. Cl.
CPC .................................. *H04W 24/10* (2013.01)

(58) Field of Classification Search
CPC ..................................................... H04W 24/10
See application file for complete search history.

(56) References Cited

U.S. PATENT DOCUMENTS

2020/0259545 A1* 8/2020 Bai ........................ H04B 7/063
2022/0322119 A1* 10/2022 Taherzadeh Boroujeni ................ H04W 24/10

* cited by examiner

*Primary Examiner* — Chuong A Ngo
(74) *Attorney, Agent, or Firm* — Amin, Turocy & Watson, LLP

(57) ABSTRACT

A user equipment may receive a data collection and reporting configuration from a radio access network node. The configuration may be an initial configuration or an activating configuration. The activating configuration may comprise identifiers indicative of information in an initial configuration. The configuration may configure the user equipment to monitor and analyze a parameter metric with respect to a corresponding parameter criterion, and to compile, or transmit, to the node, a parameter report based on the parameter metric satisfying the criterion. A parameter metric reported in a parameter report may comprise information that the node conventionally does not obtain from user equipment, such as information that may correspond to operation of the user equipment in an idle state or that may correspond to operation of a component of the user equipment. The node may adjust operation according to a learning model trained based on the parameter report.

20 Claims, 14 Drawing Sheets

100
110
115
117
125
135
137
105
120
CORE NETWORK 130
INTERNET SERVICES 150
140
145

| Row | 310 | 315 |
| --- | --- | --- |
| A | Feature ID 1 | Radio link failure (active mode) |
| B | Feature ID 2 | Radio link failure (idle mode) |
| | .. | .. |
| C | Feature ID 4 | Random access failure |
| n | Feature ID n | Feature n |

| | Trigger condition set ID (330) | Trigger criterion (335) |
|---|---|---|
| A | Trigger condition set ID 1 | Minimum i number of event failures during t period |
| B | Trigger condition set ID 2 | A minimum received coverage level at failure time |
| | : | : |
| n | Trigger condition set ID n | Trigger criterion n |

| | Data set format ID | Format |
|---|---|---|
| A | Data set format ID 1 | [RSRP] |
| B | Data set format ID 2 | [RSRP, CQI] |
| | : | : |
| C | Data set format ID 4 | [RSRP, X, Y], where X and Y are special configured radio metrics. |
| n | Data set format ID n | Format n |

A method, comprising: receiving, by a user equipment comprising a processor from a radio access network node, a data collection and reporting configuration comprising at least one parameter

805 analyzing, by the user equipment, at least one parameter metric, corresponding to the at least one parameter, with respect to at least one parameter criterion to result in at least one analyzed parameter metric, wherein the data collection and reporting configuration comprises the at least one parameter criterion

810 based on the at least one analyzed parameter metric being determined to satisfy the at least one parameter criterion, generating, by the user equipment, a parameter report comprising the at least one analyzed parameter metric

815

transmitting, by the user equipment to the radio access network node, the parameter report

820 wherein the data collection and reporting configuration is an initial data collection and reporting configuration, the method further comprising: receiving, by the user equipment, an activating data collection and reporting configuration comprising at least one parameter identifier corresponding to the at least one parameter, indicative that the user equipment is to analyze the at least one parameter metric with respect to the at least one parameter criterion corresponding to the at least one parameter identifier

825

wherein the user equipment analyzes the at least one parameter metric based on the at least one parameter criterion corresponding to, in the activating data collection and reporting configuration, the at least one parameter identifier and based on the at least one parameter criterion corresponding to the at least one parameter criterion identifier

Figure 9:
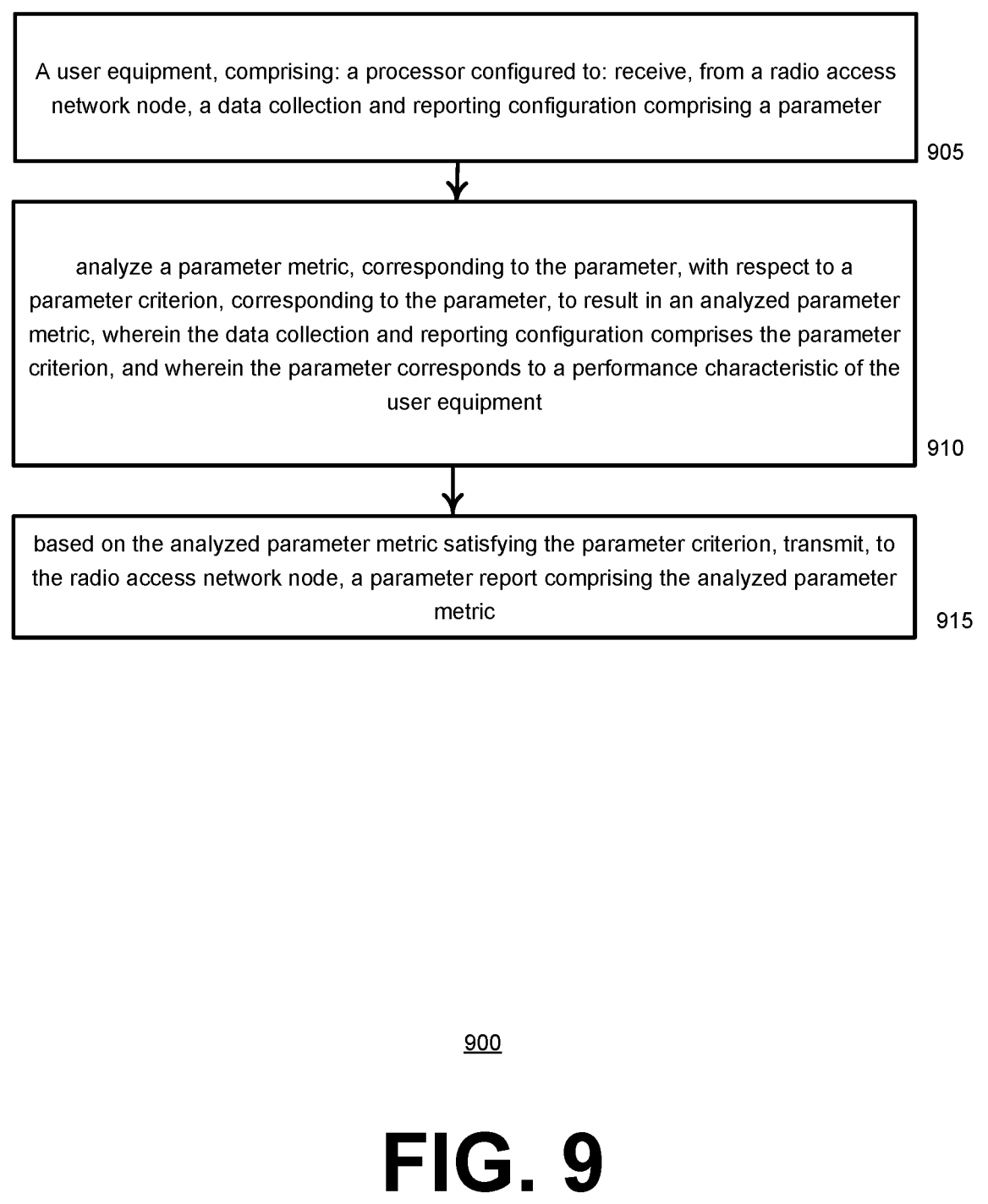

A user equipment, comprising: a processor configured to: receive, from a radio access network node, a data collection and reporting configuration comprising a parameter

905 analyze a parameter metric, corresponding to the parameter, with respect to a parameter criterion, corresponding to the parameter, to result in an analyzed parameter metric, wherein the data collection and reporting configuration comprises the parameter criterion, and wherein the parameter corresponds to a performance characteristic of the user equipment

910 based on the analyzed parameter metric satisfying the parameter criterion, transmit, to the radio access network node, a parameter report comprising the analyzed parameter metric

Figure 10:
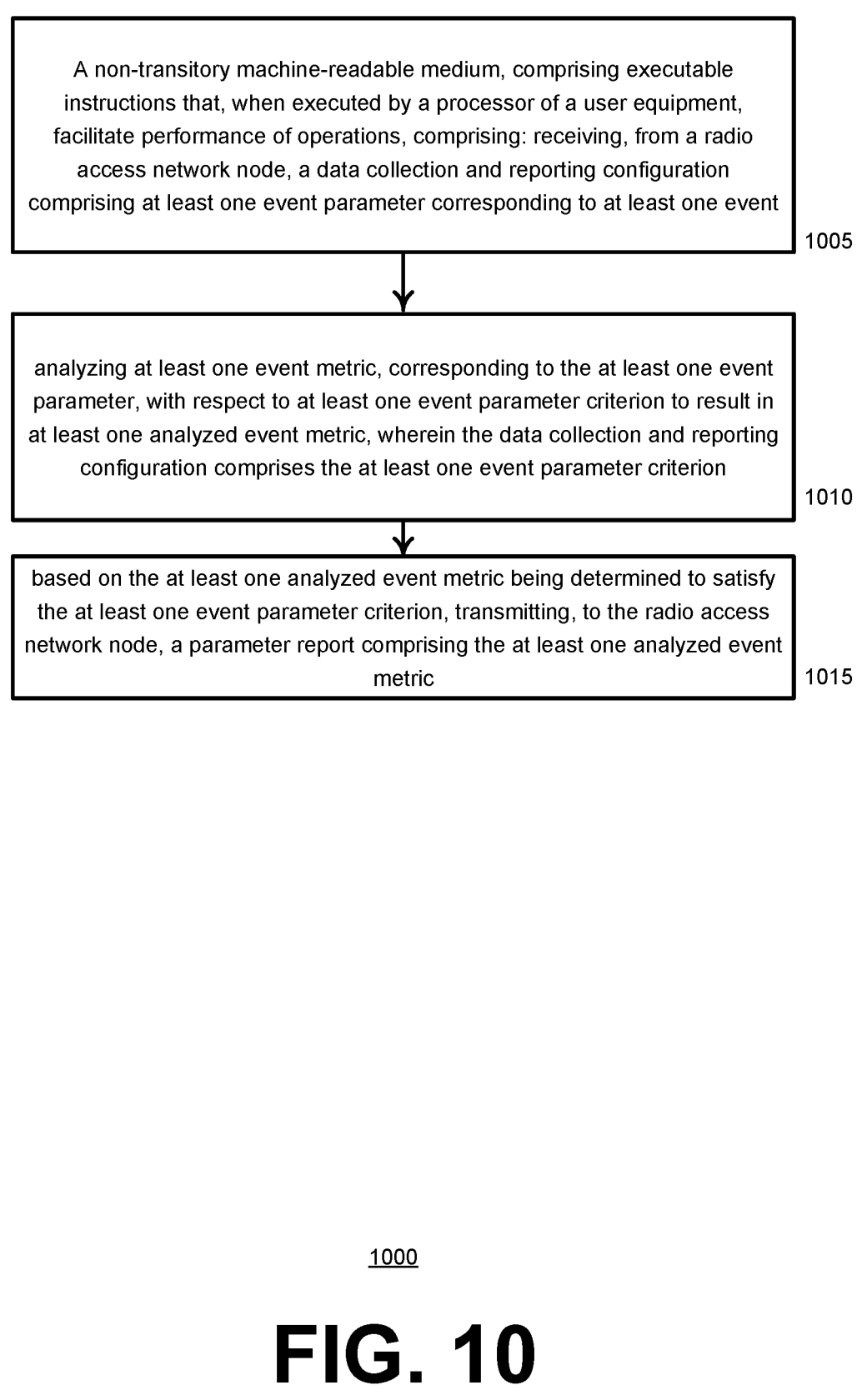

A non-transitory machine-readable medium, comprising executable instructions that, when executed by a processor of a user equipment, facilitate performance of operations, comprising: receiving, from a radio access network node, a data collection and reporting configuration comprising at least one event parameter corresponding to at least one event

1005 analyzing at least one event metric, corresponding to the at least one event parameter, with respect to at least one event parameter criterion to result in at least one analyzed event metric, wherein the data collection and reporting configuration comprises the at least one event parameter criterion

1010 based on the at least one analyzed event metric being determined to satisfy the at least one event parameter criterion, transmitting, to the radio access network node, a parameter report comprising the at least one analyzed event metric

USER EQUIPMENT ARTIFICIAL INTELLIGENCE DATA SET COMPILING AND REPORTING

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise receiving, by a user equipment comprising a processor from a radio access network node, a data collection and reporting configuration comprising at least one parameter. The method may further comprise analyzing, by the user equipment, at least one parameter metric, corresponding to the at least one parameter, with respect to at least one parameter criterion to result in at least one analyzed parameter metric, wherein the data collection and reporting configuration comprises the at least one parameter criterion. Based on the at least one analyzed parameter metric being determined to satisfy the at least one parameter criterion, the method may further comprise generating, by the user equipment, a parameter report comprising the at least one analyzed parameter metric, and transmitting, by the user equipment to the radio access network node, the parameter report. In an embodiment, transmitting of the report may be triggered based on the at least one analyzed parameter metric being determined to satisfy the at least one parameter criterion.

The at least one analyzed parameter metric may be sent, or transmitted, to the radio access network node to be used by the radio access network node to update a learning model that comprises the at least one parameter.

In an embodiment, the at least one parameter may be at least one of: at least one radio performance parameter or at least one non-radio performance parameter. In an embodiment, the at least one radio performance parameter may comprise at least one of: a first parameter applicable to a connection failure; a second parameter representative of a signal-to-noise ratio associated with a signal corresponding to the radio access network node with respect to the user equipment; a third parameter representative of a reference signal received power, a fourth parameter representative of channel quality information; a fifth parameter applicable to a precoding matrix; a sixth parameter applicable to a network resource; a seventh parameter applicable to a network layer, or an eighth parameter applicable to a network transmission rank. In an embodiment, the at least one non-radio performance parameter may comprise at least one of: a processor utilization parameter, a processor temperature parameter, or a buffer capacity parameter.

In an embodiment, the data collection and reporting configuration may further comprise at least one parameter identifier associated with the at least one parameter, at least one parameter criterion identifier associated with the at least one parameter criterion, or at least one parameter report format identifier associated with a parameter report format corresponding to the parameter report. The data collection and reporting configuration may be an initial data collection and reporting configuration. The method may further comprise receiving, by the user equipment, an activating data collection and reporting configuration comprising at least one parameter identifier corresponding to the at least one parameter, indicative that the user equipment is to analyze the at least one parameter metric with respect to the at least one parameter criterion corresponding to the at least one parameter identifier. The user equipment analyzes the at least one parameter metric based on the at least one parameter criterion corresponding to, in the activating data collection and reporting configuration, the at least one parameter identifier and based on the at least one parameter criterion corresponding to the at least one parameter criterion identifier. In an embodiment, the user equipment may generate the parameter report, according to the parameter report format, comprising the at least one analyzed parameter metric, based on the parameter report format corresponding to the at least one parameter report format identifier.

The at least one parameter may be a first parameter. The at least one parameter metric may be a first parameter metric. The at least one parameter criterion may be a first parameter criterion. The at least one analyzed parameter metric is an analyzed first parameter metric. The method may further comprise analyzing, by the user equipment, a second parameter metric, corresponding to a second parameter of the at least one parameter, with respect to a second parameter criterion of the at least one parameter criterion, to result in an analyzed second parameter metric. The parameter report may further comprise the analyzed second parameter metric based on the analyzed second parameter metric being determined to satisfy the second parameter criterion.

In an embodiment, the first parameter may be a radio performance parameter and the second parameter may be a non-radio performance parameter.

In another example embodiment, a user equipment may comprise a processor configured to receive, from a radio access network node, a data collection and reporting configuration comprising a parameter. The processor may be further configured to analyze a parameter metric, corresponding to the parameter, with respect to a parameter criterion, corresponding to the parameter, to result in an analyzed parameter metric, wherein the data collection and reporting configuration comprises the parameter criterion, and wherein the parameter corresponds to a performance characteristic of the user equipment. Based on the analyzed parameter metric satisfying the parameter criterion, the processor may be configured to transmit, to the radio access network node, a parameter report comprising the analyzed parameter metric.

The parameter may be a first parameter. The parameter criterion may be a first parameter criterion. The analyzed parameter metric may be an analyzed first parameter metric. The performance characteristic of the user equipment may be a first performance characteristic. The data collection and reporting configuration may further comprise a second parameter. The processor may be further configured to analyze a second parameter metric, corresponding to the second parameter, with respect to a second parameter criterion, corresponding to the second parameter, to result in an analyzed second parameter metric. The data collection and reporting configuration may comprise the second parameter criterion. The second parameter may correspond to a second performance characteristic of the user equipment. The transmitting of the parameter report may be further based on the analyzed second parameter metric satisfying the second parameter criterion.

In an embodiment, the performance characteristic may correspond to a utilization of the processor.

In an embodiment, the parameter criterion may comprise a utilization threshold. Satisfaction of the parameter criterion may comprise the utilization exceeding the utilization threshold. The parameter report may comprise the utilization.

In an embodiment, the processor may be a first component and the user equipment may further comprise a second component. The parameter may be a first parameter corresponding to the first component. The parameter criterion may be a first parameter criterion. The analyzed parameter metric may be an analyzed first parameter metric. The performance characteristic of the user equipment may be a first performance characteristic. The data collection and reporting configuration may further comprise a second parameter corresponding to the second component. The processor may be further configured to analyze a second parameter metric, corresponding to the second parameter, with respect to a second parameter criterion, corresponding to the second parameter, to result in an analyzed second parameter metric. The data collection and reporting configuration may comprise the second parameter criterion. The second parameter may correspond to a second performance characteristic of the user equipment. The transmitting of the parameter report may be further based on the analyzed second parameter metric satisfying the second parameter criterion.

In yet another example embodiment, a non-transitory machine-readable medium, may comprise executable instructions that, when executed by a processor of a user equipment, facilitate performance of operations that may comprise receiving, from a radio access network node, a data collection and reporting configuration comprising at least one event parameter corresponding to at least one event. The operations may further comprise analyzing at least one event metric, corresponding to the at least one event parameter, with respect to at least one event parameter criterion to result in at least one analyzed event metric. The data collection and reporting configuration may comprise the at least one event parameter criterion. Based on the at least one analyzed event metric being determined to satisfy the at least one event parameter criterion, the operations may further comprise transmitting, to the radio access network node, a parameter report comprising the at least one analyzed event metric.

In an embodiment, the at least one event parameter may correspond to failure of the user equipment to establish a connected state with the radio access network node. In an embodiment, the at least one event parameter criterion may comprise a first event parameter criterion corresponding to the at least one event. In an embodiment, the at least one event parameter criterion may further comprise a second event parameter criterion corresponding to the at least one event.

In an embodiment, the at least one event parameter may be a radio event parameter. The at least one event metric may be a radio event metric. The at least one analyzed event metric may be an analyzed radio event metric. The data collection and reporting configuration may further comprise at least one non-radio event parameter corresponding to at least one non-radio event. The operations may further comprise analyzing at least one non-radio event metric, corresponding to the at least one non-radio event parameter, with respect to at least one non-radio event parameter criterion, to result in at least one analyzed non-radio event metric. The data collection and reporting configuration may comprise the at least one non-radio event parameter criterion. The parameter report may further comprise the at least one analyzed non-radio event metric.

BRIEF DESCRIPTION OF THE DRAWINGS

FIG. 3A illustrates an example event configuration.

FIG. 3B illustrates an example reporting trigger configuration.

FIG. 3C illustrates an example report format configuration.

FIG. 8 illustrates a block diagram of an example method.

FIG. 9 illustrates a block diagram of an example user equipment.

FIG. 10 illustrates a block diagram of an example non-transitory machine-readable medium.

DETAILED DESCRIPTION OF THE DRAWINGS

Figure 1:
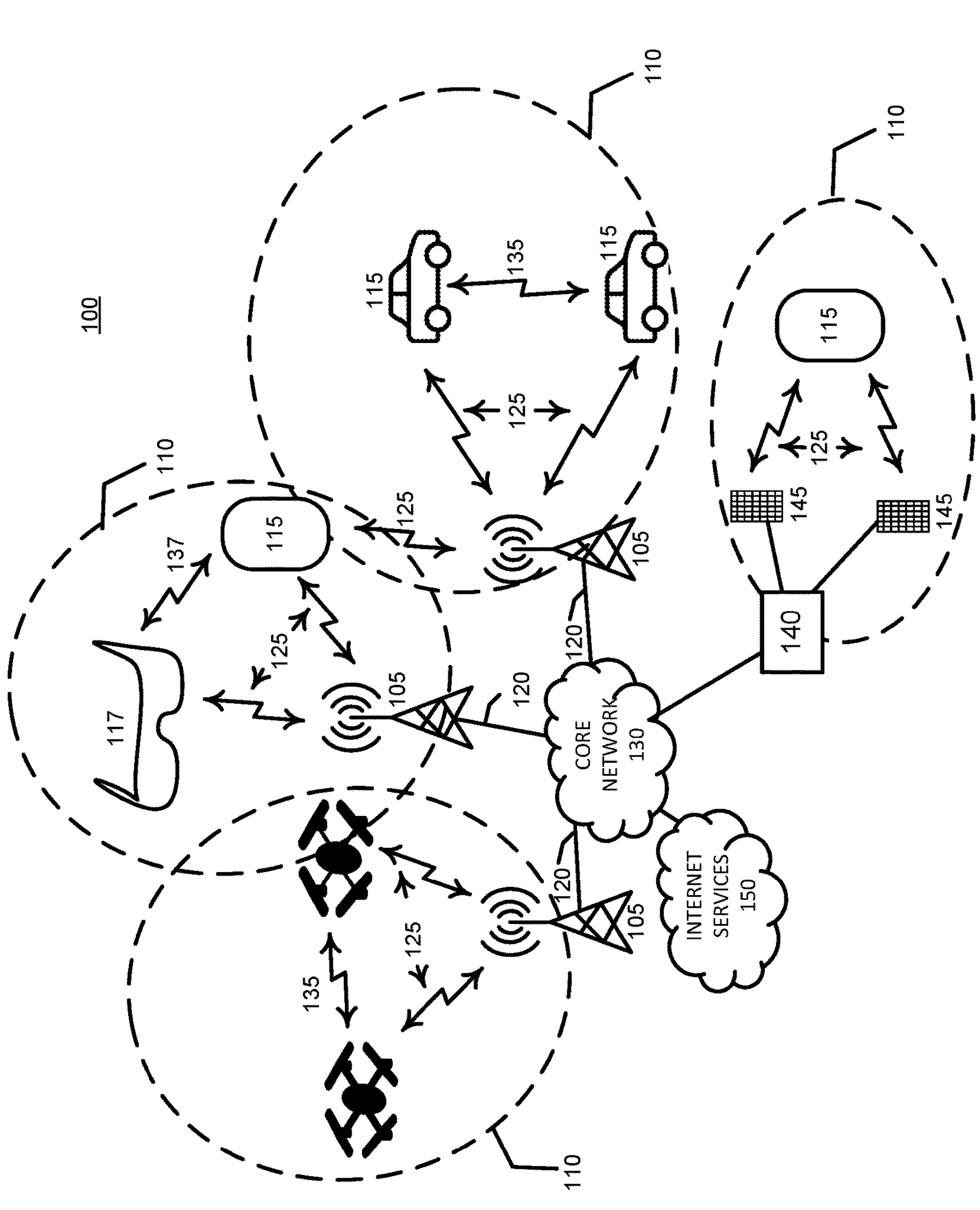
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Artificial intelligence ("AI") and machine learning ("ML") models may facilitate performance and operational functionality and improvements in 5G implementation, such as, for example, network automation, optimizing signaling overhead, energy conservation at user equipment devices, and traffic-capacity maximization. Artificial intelligence machine learning model functionality can be implemented and structured in many different forms and with varying vendor-proprietary designs. A 5G radio access network node ("RAN") of a network to which the user equipment may be attached or with which the user equipment may be registered may manage or control real-time AI/ML model performance corresponding to different user equipment devices for various radio functions.

Training AI models in the context of 5G systems, and future wireless communication technology generations, typically involves utilizing vast amounts of data and sophisticated algorithms to train the AI algorithms to recognize patterns, make predictions, and automate decision-making processes. This process typically relies on machine learning techniques, including deep learning, neural networks, and reinforcement learning. The availability of high-speed, low-latency connectivity provided by 5G networks may facilitate the training of complex AI models with large datasets in real-time, thus facilitating AI-driven applications and services.

AI learning models used with 5G systems may provide benefit based on being trained by large data generated by 5G networks and connected user equipment devices. With the proliferation of Internet of Things (IoT) devices, smart sensors, and wearable devices, 5G networks can collect and transmit a large volume of data, including real-time information indicative of network performance, user behavior, user equipment operation, and environmental factors. By training AI learning models with such data, network operators and service providers can gain valuable insight regarding utilization of their respective networks or infrastructure, optimize network resource allocation, detect network anomalies, and predict network congestion or failures.

Moreover, training AI models in 5G systems enables intelligent decision-making and automation, leading to enhanced operational efficiency and improved user experiences. For example, AI-powered algorithms can analyze network conditions, user preferences, and service requirements to dynamically allocate network resources, prioritize traffic, and optimize quality of service. This capability is beneficial in facilitating low-latency applications, such as may be used with respect to autonomous vehicles, remote surgery, and augmented reality, where split-second decisions and seamless connectivity are desirable.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHZ)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others).

In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking. Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communication system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Artificial intelligence and machine learning (collectively "AI/ML") based cellular solutions offer a wide set of performance and operational benefits such as network automation, signaling overhead reduction, energy saving, and capacity enhancement. To facilitate successful AI/ML deployments within 5G systems, learning model training and data collection at RAN nodes may be utilized. Without sufficient RAN 'knowledge' of various radio events (e.g., large and diverse performance data sets corresponding to radio events or user equipment operation), using AI/ML models at a RAN node may not facilitate operation of one or more radio functions with a level of performance that could otherwise be obtained with better AI model training. Such a scenario may arise with respect to radio events, radio function failures, or user equipment operations that occur without involvement or awareness by a radio access network node. Examples of such events may be idle mode radio link failures (e.g., user equipment devices not being able to read cell broadcast information transmitted by a radio access network node), connected mode radio link failures (e.g., a radio access network node may become aware of a connected user equipment device dropping connections, but without knowledge on why such a failure occurred), or random access failure (e.g., a user equipment device attempts multiple transmissions of a random-access preamble before the preamble is successfully received and decoded by a RAN node). Thus, lack of knowledge or information by a RAN node of events and information that may be related to causes of the events may inhibit optimizing of AI/ML models that may facilitate radio functionality related to the events. Accordingly, embodiments disclosed herein facilitate user equipment in idle mode, inactive mode, or connection mode calculate, track, and report data sets corresponding to certain configured radio events upon occurrence of configured triggering conditions.

According to embodiments disclosed herein, AI/ML algorithms, which may facilitate radio functions related to configured events, that are implemented at a RAN node may be trained by data samples collected at the time of configured radio events (a radio event may be a radio function failure). User equipment devices may be configured by a list of, or by a list of indications of, at least one radio feature, or event, to facilitate dynamic data set determination and reporting upon a configured triggering condition/criterion, occurring or being satisfied. Reporting of a data set may be made by a user equipment to a RAN node according to a configured format.

Configured adaptive triggering conditions/criteria for reporting determined data sets, corresponding to one or more certain radio event(s), may facilitate updating a RAN node with information or data corresponding to rarely-occurring events/failures corresponding to some radio functions as well as events/failures corresponding to other radio functions that may be more commonly occurring. In an example, a RAN node may be more 'interested' in data corresponding to a rarely occurring radio event because an AI/ML model may have been trained with a sparse data set corresponding to the event (data may be lacking due to the rare nature of the event), whereas an AI/ML model may already trained adequately with more commonly occurring events due to having a more robust data set because of the common nature of the event. Thus, by using embodiments disclosed herein, a RAN node may configure a user equipment to efficiently balance, or manage, consumed user equipment energy and signaling overhead with a need for AI/ML undated model data. Another example of a rare radio event may be failure of an idle user equipment to transmit, and for a RAN node to successfully receive, a random access preamble. The user equipment may attempt multiple times to transmit a random access preamble before the RAN node successfully receives a preamble from the user equipment. Thus, transmitting by the user equipment to the RAN node information relative to unsuccessful random access attempts may facilitate a RAN node training an AI/ML model.

Furthermore, different configured data set report formats facilitate a RAN node defining multiple data set formats corresponding to certain radio functions and associated performance metrics. For example, for random access failures in the uplink direction, where the failure cause is typically limited RAN node reachability and/or device power limitations (e.g., a user equipment device is far away from RAN node and even with maximum transmission power at the user equipment the random access preamble is not successfully decoded at the RAN node), a data set format, which reports device-detected pathloss, coverage levels, and potential slow fading metrics may be specified to train a corresponding AI/ML model that may facilitate random access at the RAN node. A well-trained AI/ML random access model at the RAN node may proactively predict random access failures for user equipment devices at certain locations or distances from the RAN node, and thus may proactively configure those potential user equipment devices to switch to adjacent RAN nodes (e.g., camp on neighboring nodes) or to apply additional preamble repetitions to increase the likelihood of successful uplink preamble decoding at the RAN. Embodiments disclosed herein may facilitate reporting to a RAN node radio events or failures which the RAN nodes may not typically be aware of, thus optimizing network performance and control (by possibly adopting advanced AI/ML predictive models to optimize those events/failures).

A diverse and large data set of an AI/ML model deployed in a wireless network may facilitate accurate and intelligent determination of various radio functions. However, existing models corresponding to certain radio functions/features/events may rely on a data sets that may be updated based on regular device measurement reports or based on actual radio metrics which a RAN node can determine. Thus, using conventional techniques, use of advanced AI/ML capabilities is limited to radio events that a RAN node may be aware of and use of AI/ML models for other radio events is excluded because RAN nodes are not aware of metrics corresponding thereto. For example, uplink random access failures, corresponding to idle mode user equipment devices attempting to transition to connected mode, are not captured at the RAN node according to conventional techniques. An idle mode user equipment device may transmit a first uplink preamble, to obtain network access, with a certain transmission power level. In case of no response from the RAN node, the device may transmit a second transmission of a preamble with a higher transmission power, and so on, until a response is received from the RAN node. The RAN node is not aware of how many times the user equipment transmitted a preamble before the RAN successfully decoded a preamble transmitted by the user equipment. Thus, because the information related to radio events and failures corresponding to preamble transmission are not known at the RAN node, AI/ML models corresponding to random access are not sufficiently, and in real-time, trained with respect to the events (e.g., attempts, failures, and finally success of the user equipment connection to the RAN node.

AI data set compiling and reporting.

Embodiments disclosed herein facilitate a RAN node becoming aware of potential information corresponding to radio events or failures which are not captured at the RAN node according to conventional techniques, thus facilitating AI/ML models being well-trained, or retrained, with respect to those events. In an embodiment, three configuration lists, or codebooks, may be transmitted to user equipment devices that are either in connected mode or in idle mode. In an embodiment, a list of radio features/events, or feature/event parameters, may be defined and broadcast to user equipment devices, wherein each radio event, or radiofeature, is associated with a feature index/identifier or code, which may facilitate flexibility in defining various radio functions or events. In an embodiment, a list of report triggering conditions, or criterion/criteria, corresponding to one or more events may be indicated, wherein each triggering condition indicated may be associated with a criterion identifier and may correspond to one or more triggering conditions, the occurrence of which may trigger reporting, by a user equipment, a certain configured performance parameter data set corresponding to a radio feature or radio event to which the report triggering condition(s) correspond. In an embodiment, a list of parameter metric data set formats may be transmitted to a user equipment, wherein each format corresponds to a certain set of standard or specially calculated performance parameters or metrics, corresponding to one or more radio features, or events, to calculate and report back to the RAN node, upon a triggering condition criterion being satisfied.

User equipment may be initially configured with dynamic data set collection and reporting information via a data collection and reporting configuration, which may comprise a list of radio features/events (which may be referred to as an event configuration), a list of report triggering conditions (which may be referred to as a reporting trigger configuration), and a list of data set formats (which may be referred to as a report format configuration). A data collection and reporting configuration may configure user equipment with radio event parameters to track, even if a given radio event is not directly impacting a current connection or is not conventionally obtainable by the RAN node. Accordingly, user equipment devices may compile, and/or calculate, and report back to a RAN node a set of determined performance metrics that correspond to a data set format, which may have been activated via an activating configuration. Thus, according to embodiments disclosed herein, a RAN may be made aware of certain performance parameters, related to conditions corresponding to a user equipment device that may be experiencing certain radio events or failures, that heretofore have not been provided to a RAN nodes, and thus the RAN node can train one or more AI/ML models using the data corresponding to the certain performance conditions/events or failures, and proactively configure user equipment with information derived by an AI/ML model to facilitate the user equipment avoiding the conditions or events in the future.

Sidelink (e.g., device to device) communication links may be an exemplary deployment that may benefit from use of embodiments disclosed herein, wherein critical in-proximity devices (e.g., autonomous vehicles) are able to communicate with each other without direct network involvement, and thus without RAN node knowledge of radio conditions that may exist with respect to a user equipment corresponding to an autonomous vehicle. Because a RAN node has little knowledge about actual user equipment device performance via sidelink interface communication links, without using embodiments disclosed herein an AI/ML model for optimizing sidelink communication link performance and sidelink configurations may be misled by lack of training samples (e.g., lack of data collection corresponding to the sidelink communication link(s) 135). According to embodiments disclosed herein, a RAN node may configure user equipment devices to dynamically compile and report certain sidelink link events or failures upon a reporting condition criterion being satisfied or met. In addition to facilitating updating AI/ML learning models corresponding to certain radio functions, with respect to which the RAN node has little knowledge regarding the cause(s) or corresponding performance conditions at the point of failure, embodiments disclosed herein may facilitate non-AI/ML implementations, wherein dynamic Operations and Management are in place.

Accordingly, embodiments disclosed herein facilitate dynamic data collection and reporting that may be adaptively fine-tuned to be feature-specific or event-specific as compared to conventional user equipment device measurement and reporting procedures that may be related to radio performance but not related to a certain event or feature. Embodiments disclosed herein may also facilitate updating a learning model using data, or information, corresponding to radio events or failures that may not directly impact a RAN node and that conventionally are not captured thereby. For example, poor sidelink communications and poor random-access performance/events are not captured at the RAN node according to conventional techniques because corresponding parameter metrics are typically related to user equipment device performance instead of RAN node performance.

Novel behavior at a user equipment may comprise capturing standard, or specially-calculated, performance parameter metrics upon the occurrence of certain radio events that satisfy a configured criterion. Thus, unlike with conventional radio measurements corresponding to major radio metrics that may or may not relate to certain radio events or failures, user equipment devices may capture, or calculate, radio performance indicators or metrics upon the occurrence of configured radio events, of which RAN nodes are not conventionally aware.

Figure 2:
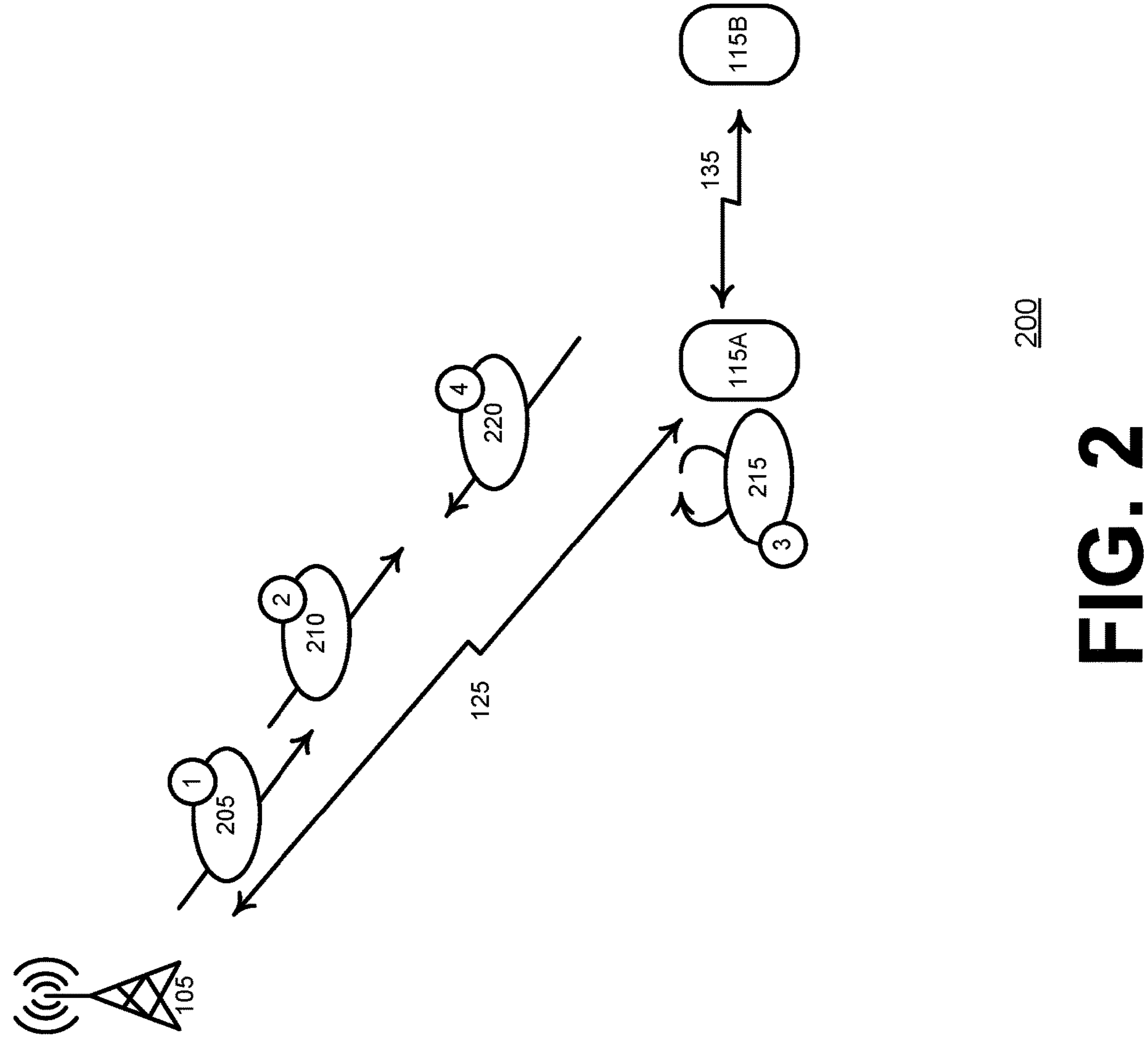
FIG. 2 illustrates an example environment with a user equipment being configured to report an event metric to a radio access network node.

Turning now to FIG. 2, the figure illustrates environment 200 in which radio access network node 105 may transmit to user equipment 115A data collection and reporting configuration 205 at act 1. Configuration 205 may be transmitted via long-range wireless link 125. Configuration 205 may be referred to as an initial data collection and reporting configuration. User equipment 115A may be part of a sidelink group that comprises user equipment 115B. User equipment 115A may communicate with user equipment 115B via sidelink communication link 135. Data collection and reporting configuration 205 may comprise an event configuration, a reporting trigger configuration, or a reporting format configuration, example of which are shown in FIG. 3A, FIG. 3B, and FIG. 3C, respectively. At act 2, RAN node 105 may transmit an activating data collection and reporting configuration 210, which is described in more detail in reference to FIG. 4. At act 3 shown in FIG. 2, user equipment 115A may monitor parameters corresponding to events indicated in configuration 205 or configuration 210. Upon a condition or criterion, which may be indicated in configuration 205 or configuration 210, being satisfied by monitored parameters, user equipment 115A may transmit at act 4 a parameter report 220 containing metrics determined by user equipment 115A at act 3.

Turning now to FIG. 3A, the figure illustrates an example event configuration 305. As shown in FIG. 3A, a list of features/events 315A-n, which may be radio features/events, is defined. Features/events 315A-n may be referred to as parameters. Feature identifiers 310A-n are associated, respectively, in configuration 305 with events 315. A user equipment that receives configuration 305 may track/monitor parameter metrics corresponding to one or more events 315. The user equipment may compile a report comprising the metrics and transmit the compiled report to a RAN node upon an event criterion corresponding to the one or more metrics being satisfied. Configuration 305 can be part of a device-specific connection management signaling message received by a user equipment from a RAN nodes upon initial connection establishment. The ability to define radio events and radio features in configuration 305 may facilitate use by third party vendors of new user equipment device types that may implement special device capabilities. Accordingly, special event parameters may be defined in configuration 305 to accommodate determining of parameter metrics corresponding to the special event parameters. For example, a battery-less device type category may comprise capability-limited devices/sensors that implement signal backscattering technology to use received signal energy to transmit small messages without storing energy nor having a battery. The messages may be fed-back via backscattering multi-path signals. For this exemplary device class, using embodiments disclosed herein, a backscattering outage event may be defined such that user equipment devices may compile, calculate, and dynamically report back current backscatter channel characteristics such that a RAN node triggers a backscattering signal enhancement. The user equipment devices may be in idle state, without impacting the radio performance, and according to conventional techniques a RAN node and may not have awareness or intervention with respect to the user equipment, which may not be able to transmit any critical sensing payload in the uplink direction.

FIG. 3B illustrates an example reporting trigger configuration 325. As shown in FIG. 3B, a list of possible triggering condition sets 335A-n is defined. A triggering condition set 335 may be referred to as a parameter criterion. A parameter criterion 335 may be associated with one of respective criterion identifiers 330A-n. A criterion identifier 330 may be used to indicate to a user equipment a triggering condition set, or reporting condition set, corresponding to one or more radio or non-radio conditions that, when met or satisfied, may trigger collecting or reporting, by a user equipment, of certain performance parameter metrics corresponding to the criterion. For example, a criterion 335 may comprise a minimum number of events during a period (e.g., a maximum number of failed random-access attempts during a configured period). Failure to connect with a RAN node may trigger a user equipment that is attempting to connect to the RAN node to compile and report back to the RAN node a configured data set corresponding to the random access failure(s).

FIG. 3C illustrates an example report format configuration 345. As shown in FIG. 3C, multiple data set formats 355A-n are defined, wherein radio performance parameter metrics to be reported via a format 335 may have been monitored/tracked, calculated, or compiled. A data set format 355 may be associated with one of respective format identifiers 350A-n. Data set formats 355 may be useful to report various radio events or failures. Furthermore, for special device classes, data set formats 355 corresponding to specially defined performance metrics can be defined and reported back to a RAN node, wherein the parameters selected correspond to radio events of interest.

In an embodiment, data collection and reporting configuration 205 shown in FIG. 2 may comprise event configuration information described in reference to event configuration 305 shown in FIG. 3A, criterion information described in reference to reporting trigger configuration 325 shown in FIG. 3B, or report format configuration information described in reference to report format configuration 345 shown in FIG. 3C.

Figure 4:
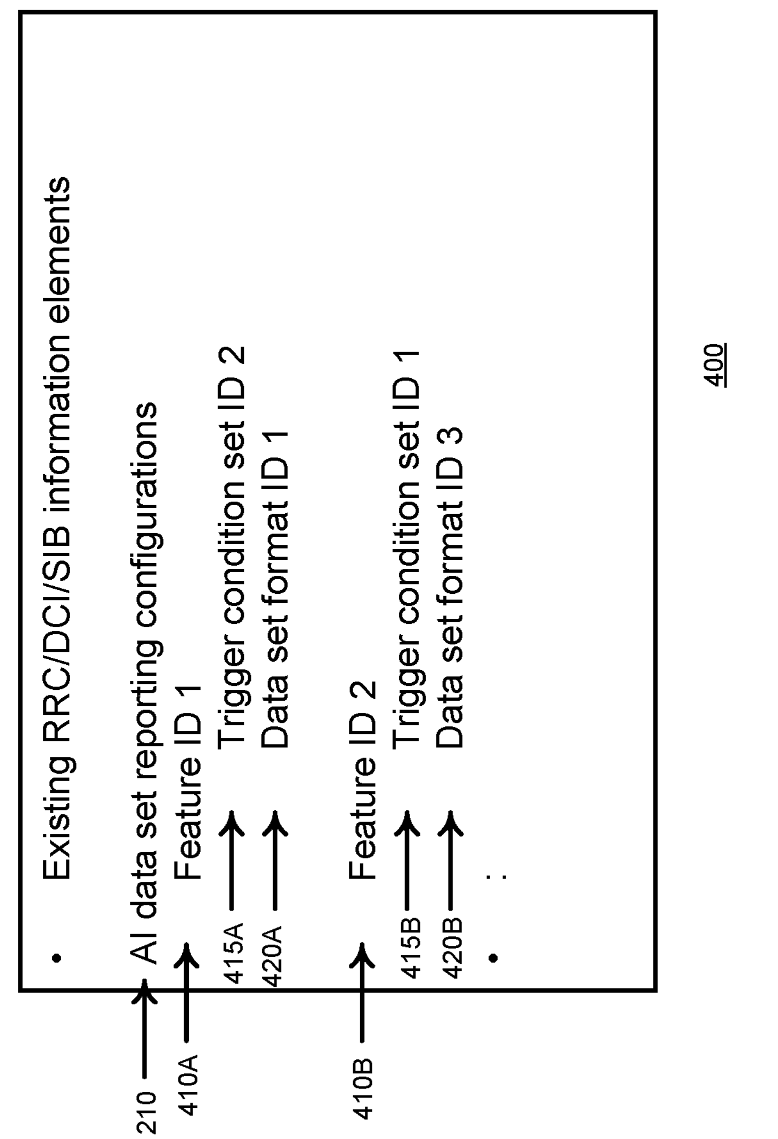
FIG. 4 illustrates an example activating data collection and reporting configuration message.

Turning now to FIG. 4, the figure illustrates an example activating configuration message 400 comprising activating data collection and reporting configuration 210, which may be used by a user equipment to determine one or more metrics and to report the one or more metrics to a radio access network node. In an embodiment, activating configuration 210 may be transmitted to a user equipment as part of as an initial connection establishment and may comprise one or more event identifiers, or codes, for which AI data set collection and reporting is activated. Although activating data collection and reporting configuration 210 may be transmitted by a RAN node as part of an initial connection establishment, the RAN node may have already transmitted to the user equipment an initial data collection and reporting configuration, such as configuration 205 described in reference to FIG. 2. For each feature or event indicated in configuration 210, an associated triggering condition identifier, or index, and a data set format may be indicated to user equipment. As shown in FIG. 4, a RAN node may configure idle or inactive user equipment devices via activating configuration 210 to dynamically compile a dataset indicated by an indicator in data set report format indication field 420 that may comprise an indication 350 that corresponds in configuration 345 to a format 355. A trigger condition identifier field 415 may comprise a reporting criterion identifier 330 that may correspond to a criterion 335 in configuration 325. An event/feature identifier field 410 may comprise an event/feature identifier 310 corresponding in configuration 305 to an event 315.

Figure 5:
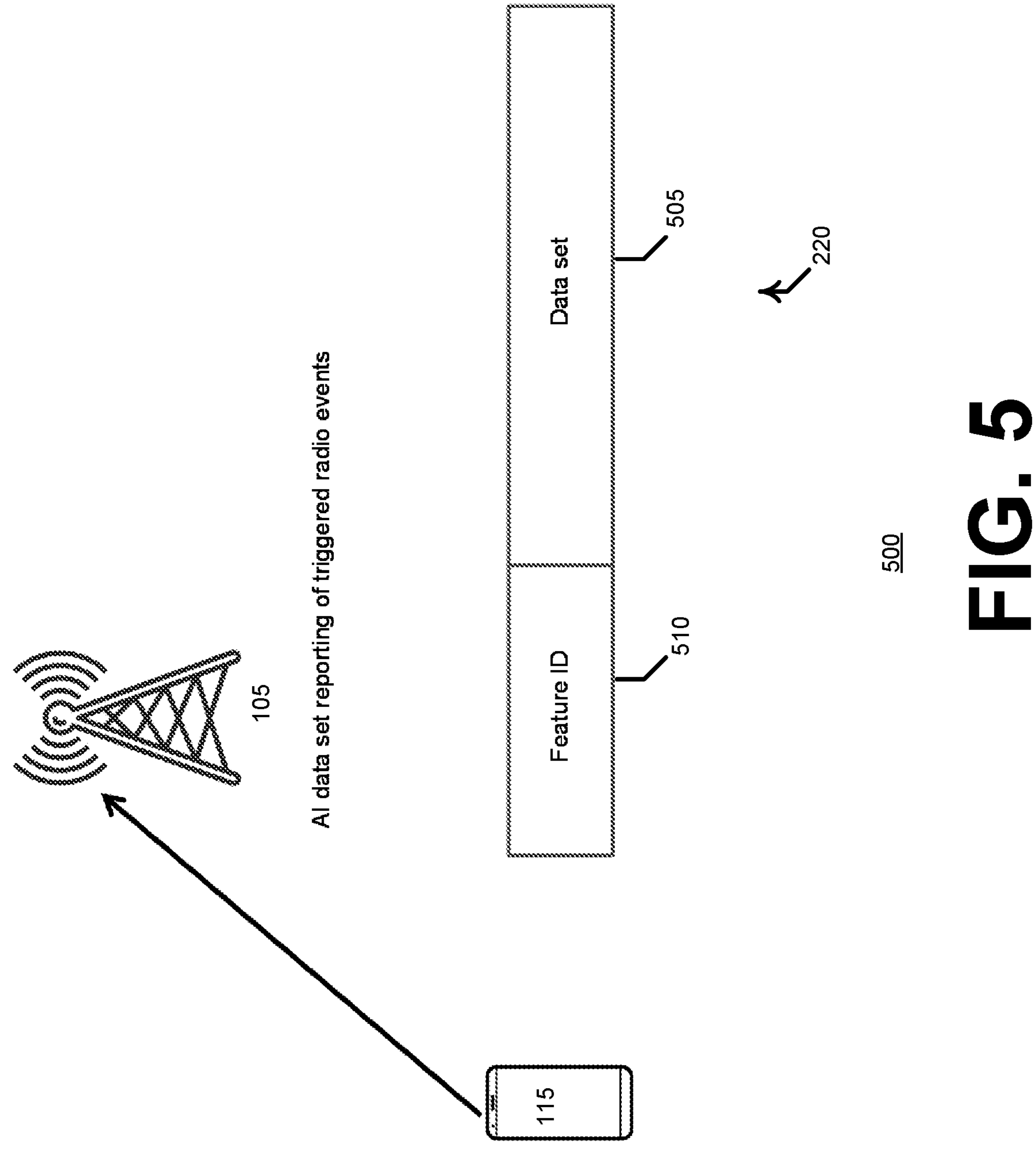
FIG. 5 illustrates an example environment with a user equipment transmitting an example parameter report to a radio access network node.

Turning now to FIG. 5, the figure illustrates environment 500. Radio access network node 105 may receive from user equipment 115A an event report 220 comprising an event metric in event metric field 505. The event metric contained in event metric field 505 may be associated in event report 220 with an event identifier in event identifier field 510. An event identified in event identifier field 510 may correspond to an event identified by the same event identifier 310 contained in event configuration 305 described in reference to FIG. 3A. The event identifier contained in event identifier field 510 may have been included in data collection and reporting configuration 205 as described in reference to FIG. 2 or indicated in configuration 210 described in reference to FIG. 4.

Upon a user equipment device receiving a data collection and reporting configurations, such as configuration 205 or configuration 210, the user equipment may monitor event parameters, which may correspond to radio events or to device component events, for which data collection is activated by the data collection and reporting configuration, and determine metrics corresponding to the monitored parameters. Accordingly, on condition of determined parameter metrics satisfying a criterion indicated in configuration 205 or in configuration 210, user equipment 115 may compile a report 220, that may comprise parameter metrics in field 505 associated with an event identifier in field 510. User equipment 115 may aggregate multiple parameter metrics in respective multiple fields 505 and corresponding event identifiers in fields 510 within a single report 220.

Figure 6:
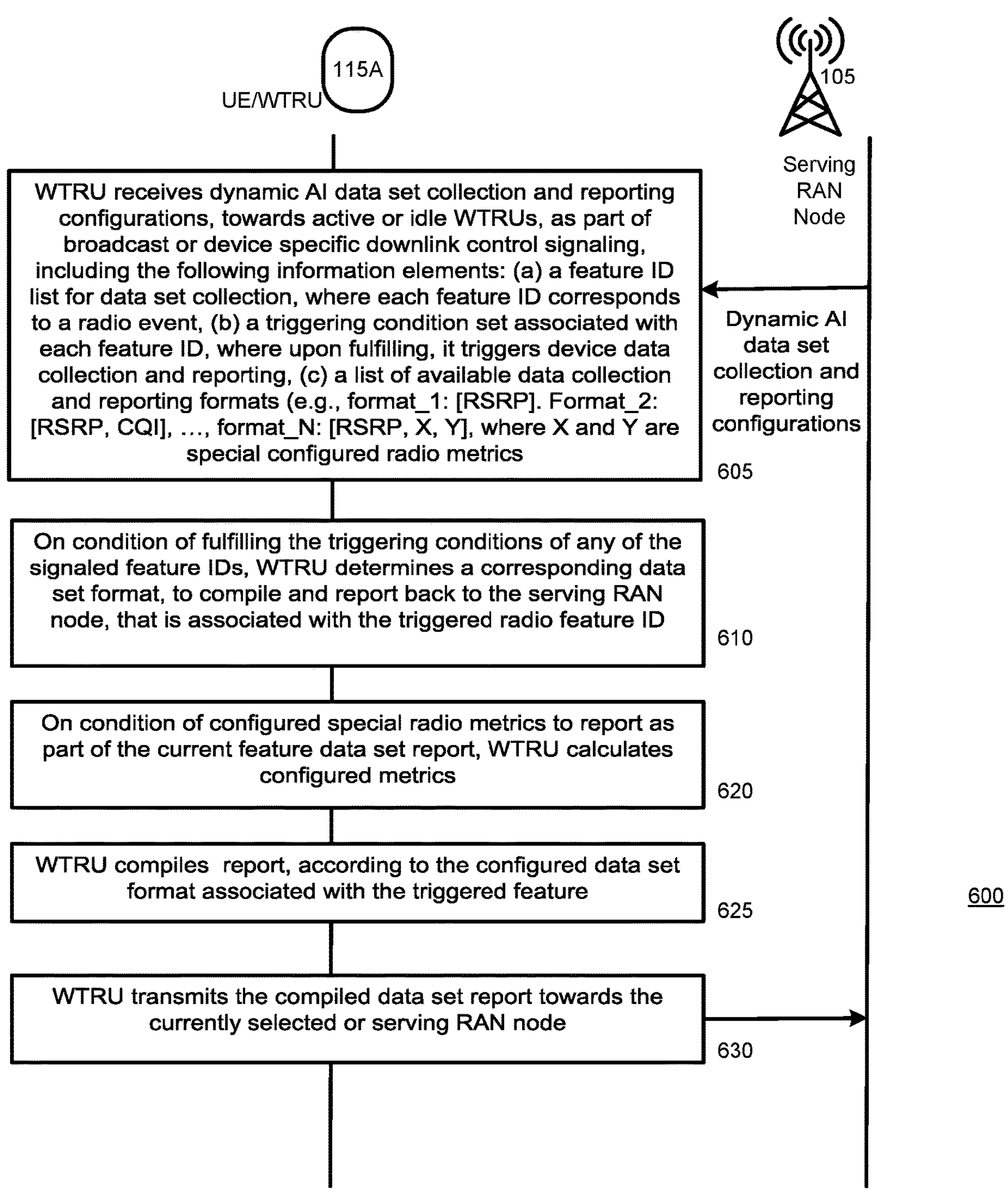
FIG. 6 illustrates a timing diagram of an example method to configure a user equipment to determine one or more metrics and to report the one or more metrics to the radio access network node.

Turning now to FIG. 6, the figure illustrates a timing diagram of an example method 600. At act 605, user equipment 115A may receive from radio access network 105 a data collection and reporting configuration, such as data collection and reporting configuration 205 described in reference to FIG. 2. In an embodiment, the configuration received at act 605 may be an activating data collection and reporting configuration 210 as described in reference to FIG. 2 and FIG. 4. A configuration transmitted at act 605 by RAN 105 towards active or idle UE/WTRU 115A may be transmitted as part of broadcast or device-specific downlink control signal messaging, and may comprise a feature/event list for data set collection with feature/event identifiers corresponding to radio event(s) or non-radio event(s). A configuration transmitted at act 605 may comprise criterion information in a reporting trigger configuration that may include one or more report triggering condition set(s), or criterion/criteria, associated with respective event identifiers. Upon a report triggering criterion/criteria being met, or satisfied, user equipment 115A may determine one or more parameter metric(s) corresponding to one or more events associated with the event identifier(s), and the user equipment may generate a report comprising the determined parameter metrics. A configuration transmitted at act 605 may comprise a list of data collection and reporting formats, such as formats 355 corresponding to format identifiers 350 described in reference to FIG. 3C. Examples of formats 355 may be: format_1: [RSRP]; Format_2: [RSRP, CQI]; . . . ; format_N: [RSRP, X, Y], where X and Y are special configured radio metrics.

Upon a configured reporting trigger criterion corresponding to one or more events being determined to be satisfied by parameter metrics corresponding to the event(s), at act 610 UE/WTRU 115A may determine a format, such as a format 355 shown in FIG. 3C, corresponding to the determined parameter metrics. At act 620, if a configuration received at act 605 comprises an indication of special parameter metrics (e.g., metrics that are not typically reported to a RAN node by a user equipment or metrics that are not typically monitored by a user equipment) to report as part of the current feature data set report, UE/WTRU 115A may calculate, or determine, the configured special parameter metrics, which may be radio metrics or non-radio metrics. At act 625, UE/WTRU 115A may compile a parameter report, according to the format determined at act 610, that comprises parameter metrics corresponding to event(s)/parameter(s) criterion/criteria with respect to which the parameter metrics were analyzed. On condition of the parameter criterion/criteria being determined to be satisfied, UE/WTRU 115A, which may be in an idle state or in a connected state, may transmit at act 630 the compiled parameter report towards currently selected or serving RAN node 105. The parameter report may be transmitted at act 630 as part of an uplink control signal message.

Figure 7:
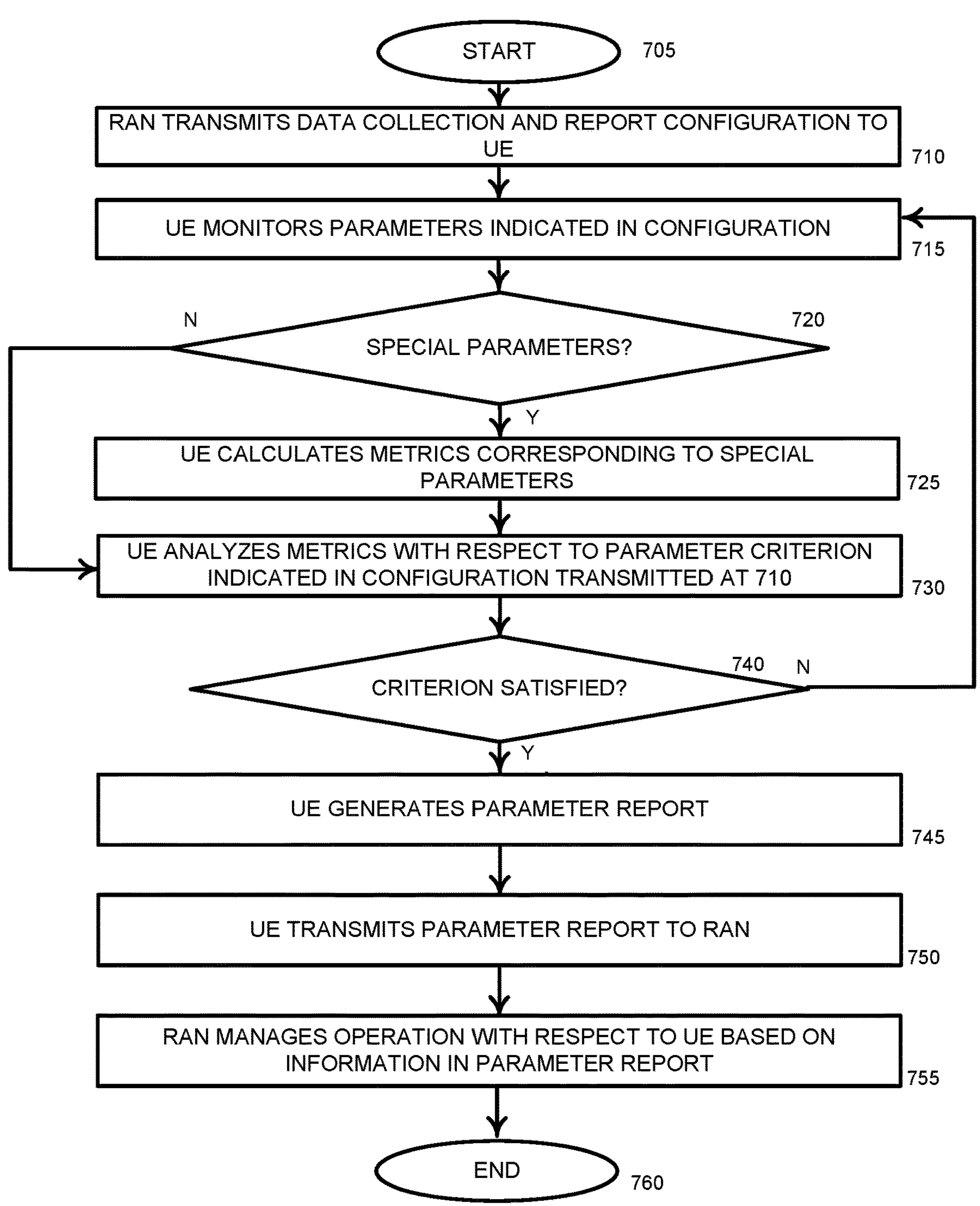
FIG. 7 illustrates a flow diagram of an example method to configure a user equipment to determine one or more metrics and to report the one or more metrics to the radio access network node.

Turning now to FIG. 7, the figure illustrates a flow diagram of an example embodiment method 700. Method 700 begins at act 705. At act 710, a radio access network node may transmit to a user equipment a data collection and reporting configuration, such as data collection and reporting configuration 205 described in reference to FIG. 2. In an embodiment, the data collection and reporting configuration transmitted at act 710 may comprise an activating data collection and reporting configuration 210 as described in reference to FIG. 2, and which may comprise identifiers corresponding to events, criterion, or report formats as described in reference to FIG. 4. Accordingly, a radio access network node may configure a user equipment with events/parameters to be monitored, criterion corresponding to the events/parameters that may be used to determine when to compile or transmit a report to the radio access network node, or report formats to be used to report metrics to the radio access network node. If a configuration received by a user equipment from a radio access network node at act 710 is an initial configuration, such as, for example, configuration 205, the user equipment may receive the data collection and reporting configuration 205, which may comprise identifiers corresponding to the parameters, criterion, and formats, but may not monitor parameters, or analyze or report parameter metrics until an activating configuration, for example a configuration 210, is received from the radio access network node. Thus, an initial configuration, which may comprise more information or data than an activating configuration since multiple events/parameters, multiple criterion or criteria, or multiple report formats may be transmitted to the user equipment once via an initial configuration, and multiple, smaller, and different activating configurations may be transmitted to the user equipment, as determined by the radio access network node, that may comprise identifiers indicative of, and corresponding to, in the initial configuration, parameters, criterion, or parameter report formats.

At act 715, the user equipment may monitor parameters indicated in the configuration received at act 710. At act 720, the user equipment may determine whether parameters indicated in the configuration received at act 710 correspond to special parameters, or parameters that the user equipment may not be configured to typically monitor, determine, analyze, or report. If a determination made it act 720 is that a configuration received at act 710 comprises special parameters, method 700 advances to act 725. At act 725, the user equipment may calculate metrics, corresponding to parameters indicated in the configuration, based on parameters monitored at act 715. After calculating special parameter metrics at act 725, method 700 advances to act 730. Returning to description of act 720, if a determination is made that a configuration received at act 710 does not indicate that the user equipment is to determine metrics corresponding to special parameters, method 700 advances to act 730.

At act 730, the user equipment may analyze metrics, either measured at act 715 or determined that act 725, with respect to criterion, or criteria, indicated in the configuration received at act 710 and corresponding to the parameters, or special parameters, indicated in the configuration. At act 740, the user equipment may determine whether a parameter criterion, or criteria, is/are satisfied by the metric(s) that were measured at act 715 or determined at act 725. Satisfaction of the criterion, or criteria, may trigger the user equipment to compile or transmit a parameter report that comprises metrics measured, or based on metrics that were measured, at a time that the metrics were measured. If a determination is made that the measured or determined metrics do not satisfy a corresponding criterion, or criteria, method 700 returns to act 715. If a determination made at act 740 is that a parameter criterion, or criteria, is satisfied, thus indicative that the user equipment should compile or transmit a parameter report, the user equipment generates at act 745 a parameter report. A parameter report generated at act 745 may comprise parameter metrics measured at act 715 or determined at act 715 associated with a parameter identifier. At act 750, the user equipment may transmit the parameter report to the radio access network node. At act 755, the radio access network node may receive the parameter report and may manage operation (e.g., train an AI model) with respect to the user equipment based on information contained in the parameter report. Method 700 advances to act 760 and ends.

The radio access network node may use information received in a parameter report to update, or train, and artificial intelligence learning model to facilitate better operation with respect to the user equipment than if the user equipment had not obtained information in the parameter report and transmitted the parameter report to the radio access network node. Because the parameter report may comprise event/parameter metrics corresponding to a time when monitored parameter metrics satisfied a reporting criterion, or criteria, that triggered generating or transmitting a parameter report, and because the radio access network node may have information corresponding to the user equipment at the time the metric satisfied the criterion, or criteria, for example a location of the user equipment with respect to the radio access network node, the radio access network node may be able to better serve the user equipment than if the parameter report comprising metrics that the radio access network node may not be able to otherwise obtain from the user equipment was not transmitted to the radio access network node. For example, a radio access network node may be unaware of a number of times that a user equipment unsuccessfully attempts to transmit a random-access preamble with successively increasing power levels before an attempt to transmit a random-access preamble to the radio access network node is successful. If a parameter metric is a transmit power of the user equipment successfully transmitting a random access preamble, and the parameter criterion is a number of random access attempts by the user equipment before a successful connection establishment with the radio access network node is made, the radio access network node may make adjustments to facilitate connection establishment by user equipment located at the location corresponding to the user equipment that transmitted the parameter report indicative of the number of unsuccessful random access attempts. Other examples of parameters, of which the radio access network node may not typically be aware, may comprise a signal strength corresponding to the radio access network node at the user equipment and a report triggering criterion may be a processor loading or processor heating at the user equipment. Thus, if a radio access network node receives from the user equipment a parameter report indicating a signal strength metric corresponding to a received signal, and the transmitting of the parameter report was configured by the radio access network node to be triggered by a specified processor loading or a processor heating metric, radio access network node may use information contained in the parameter report to train an artificial intelligence learning model to adjust a transmit power of a signal transmitted to the user equipment, or transmitted to other user equipment that may be located at the same location at which the user equipment that transmitted the parameter report was when the parameter report was transmitted, to facilitate reduced power consumption by the user equipment.

Turning now to FIG. 8, the figure illustrates an example embodiment method 800 comprising at block 805 receiving, by a user equipment comprising a processor from a radio access network node, a data collection and reporting configuration comprising at least one parameter; at block 810 analyzing, by the user equipment, at least one parameter metric, corresponding to the at least one parameter, with respect to at least one parameter criterion to result in at least one analyzed parameter metric, wherein the data collection and reporting configuration comprises the at least one parameter criterion, at block 815 based on the at least one analyzed parameter metric being determined to satisfy the at least one parameter criterion, generating, by the user equipment, a parameter report comprising the at least one analyzed parameter metric; at block 820 transmitting, by the user equipment to the radio access network node, the parameter report; at block 825 wherein the data collection and reporting configuration is an initial data collection and reporting configuration, the method further comprising: receiving, by the user equipment, an activating data collection and reporting configuration comprising at least one parameter identifier corresponding to the at least one parameter, indicative that the user equipment is to analyze the at least one parameter metric with respect to the at least one parameter criterion corresponding to the at least one parameter identifier; and at block 830 wherein the user equipment analyzes the at least one parameter metric based on the at least one parameter criterion corresponding to, in the activating data collection and reporting configuration, the at least one parameter identifier and based on the at least one parameter criterion corresponding to the at least one parameter criterion identifier.

Turning now to FIG. 9, the figure illustrates a user equipment 900, comprising at block 905 a processor configured to receive, from a radio access network node, a data collection and reporting configuration comprising a parameter; at block 910 analyze a parameter metric, corresponding to the parameter, with respect to a parameter criterion, corresponding to the parameter, to result in an analyzed parameter metric, wherein the data collection and reporting configuration comprises the parameter criterion, and wherein the parameter corresponds to a performance characteristic of the user equipment; and at block 915 based on the analyzed parameter metric satisfying the parameter criterion, transmit, to the radio access network node, a parameter report comprising the analyzed parameter metric.

Turning now to FIG. 10, the figure illustrates a non-transitory machine-readable medium 1000 comprising at block 1005 executable instructions that, when executed by a processor of a user equipment, facilitate performance of operations, comprising receiving, from a radio access network node, a data collection and reporting configuration comprising at least one event parameter corresponding to at least one event; at block 1010 analyzing at least one event metric, corresponding to the at least one event parameter, with respect to at least one event parameter criterion to result in at least one analyzed event metric, wherein the data collection and reporting configuration comprises the at least one event parameter criterion; and at block 1015 based on the at least one analyzed event metric being determined to satisfy the at least one event parameter criterion, transmitting, to the radio access network node, a parameter report comprising the at least one analyzed event metric.

Figure 12:
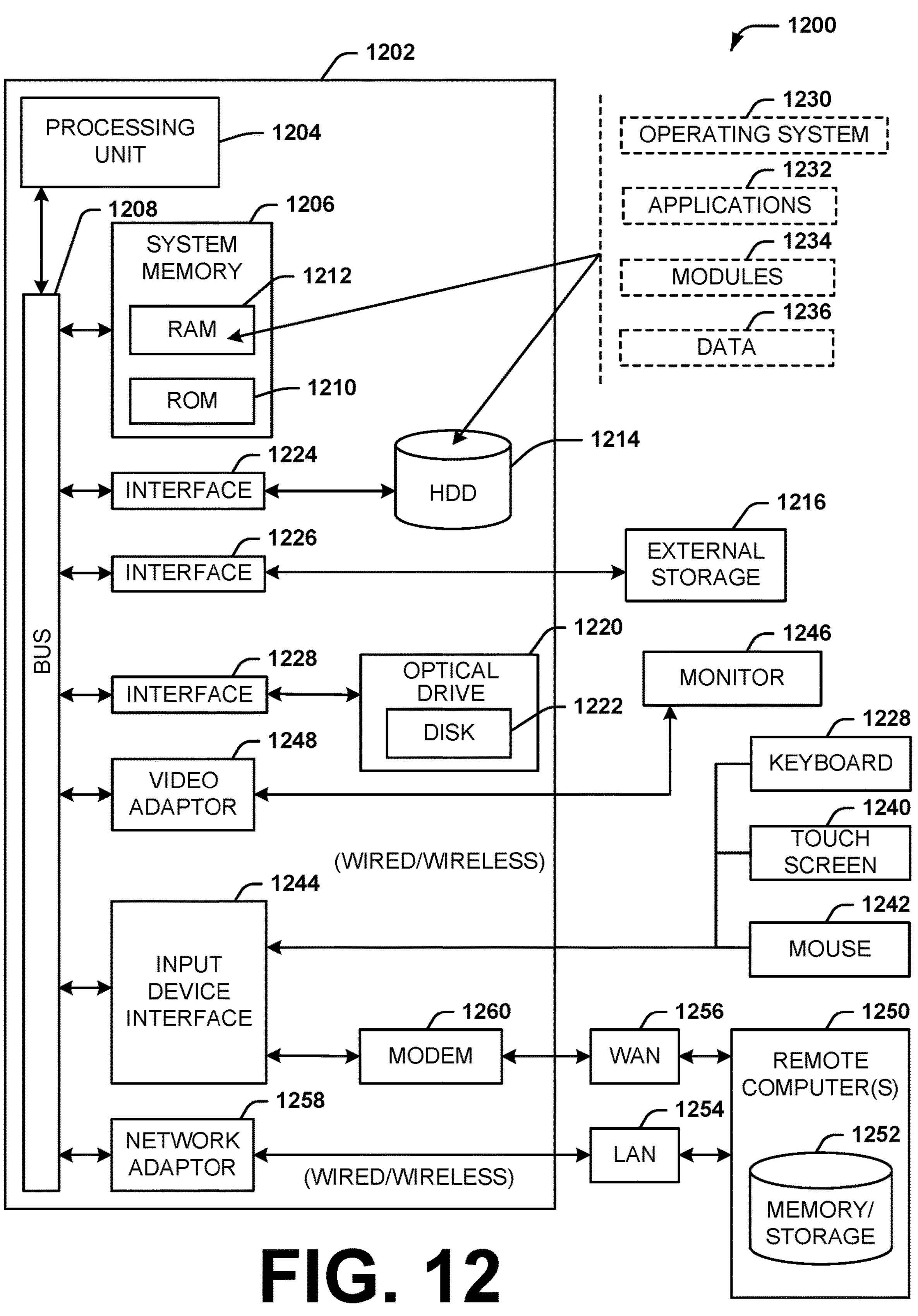
FIG. 12 illustrates an example computer environment.

In order to provide additional context for various embodiments described herein, FIG. 12 and the following discussion are intended to provide a brief, general description of a suitable computing environment 1200 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors and may include a cache memory. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

Computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can comprise a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
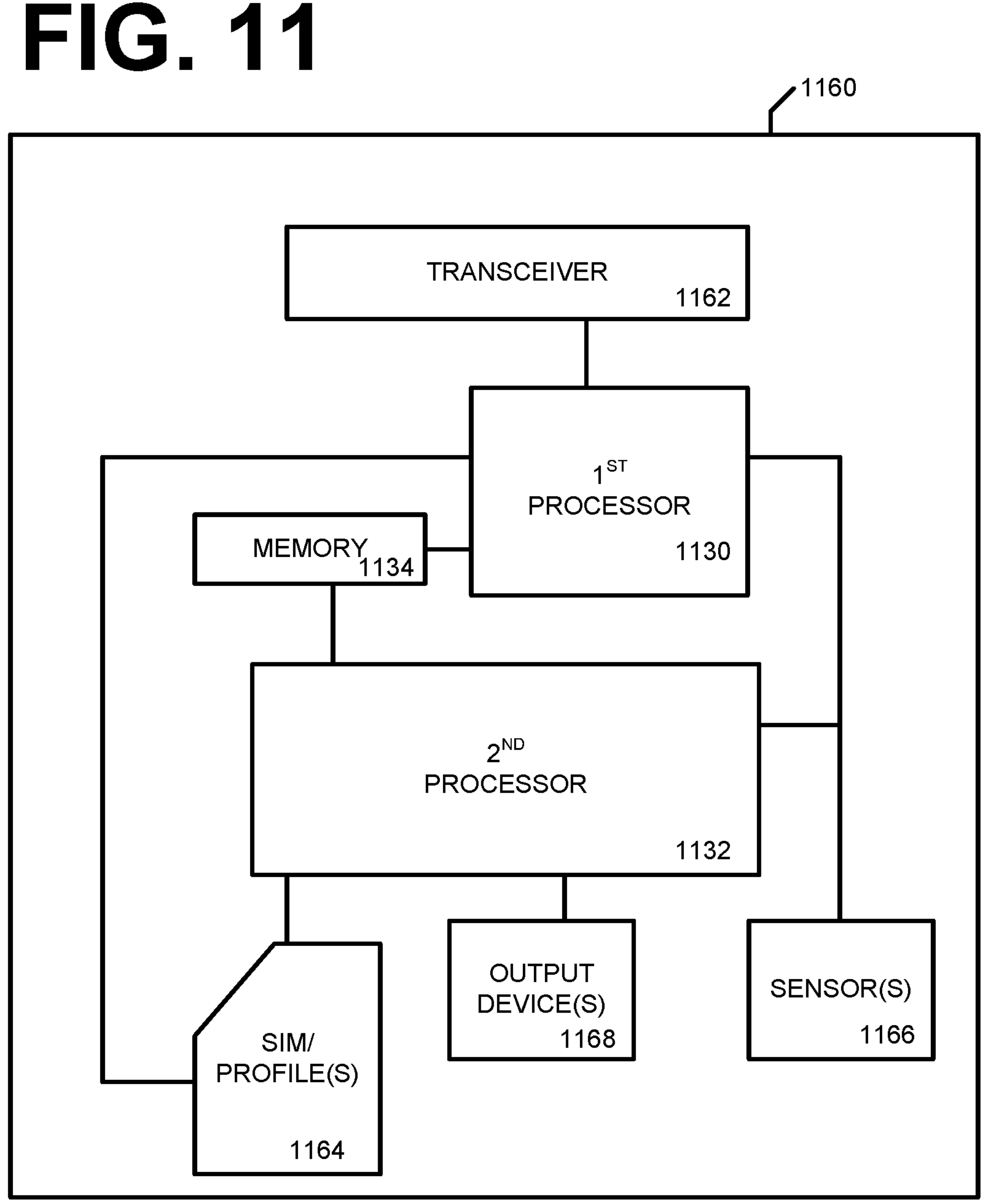
FIG. 11 illustrates a block diagram of an example wireless UE.

Turning to FIG. 11, the figure illustrates a block diagram of an example UE 1160. UE 1160 may comprise a smart phone, a wireless tablet, a laptop computer with wireless capability, a wearable device, a machine device that may facilitate vehicle telematics, a tracking device, remote sensing devices, and the like. UE 1160 comprises a first processor 1130, a second processor 1132, and a shared memory 1134. UE 1160 includes radio front end circuitry 1162, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1162 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 11, UE 1160 may also include a SIM 1164, or a SIM profile, which may comprise information stored in a memory (memory 1134 or a separate memory portion), for facilitating wireless communication with RAN 105 or core network 130 shown in FIG. 1. FIG. 11 shows SIM 1164 as a single component in the shape of a conventional SIM card, but it will be appreciated that SIM 1164 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1164 and another device, which may be a component of RAN 105 or core network 130 shown in FIG. 1). A SIM profile 1164 may also comprise identifying information that is unique to the SIM, or SIM profile, such as, for example, an International Mobile Subscriber Identity ("IMSI") or information that may make up an IMSI.

SIM 1164 is shown coupled to both the first processor portion 1130 and the second processor portion 1132. Such an implementation may provide an advantage that first processor portion 1130 may not need to request or receive information or data from SIM 1164 that second processor 1132 may request, thus eliminating the use of the first processor acting as a 'go-between' when the second processor uses information from the SIM in performing its functions and in executing applications. First processor 1130, which may be a modem processor or a baseband processor, is shown smaller than processor 1132, which may be a more sophisticated application processor, to visually indicate the relative levels of sophistication (i.e., processing capability and performance) and corresponding relative levels of operating power consumption levels between the two processor portions. Keeping the second processor portion 1132 asleep/inactive/in a low power state when UE 1160 does not need it for executing applications and processing data related to an application provides an advantage of reducing power consumption when the UE only needs to use the first processor portion 1130 while in listening mode for monitoring routine configured bearer management and mobility management/maintenance procedures, or for monitoring search spaces that the UE has been configured to monitor while the second processor portion remains inactive/asleep.

UE 1160 may also include sensors 1166, such as, for example, temperature sensors, accelerometers, gyroscopes, barometers, moisture sensors, and the like that may provide signals to the first processor 1130 or second processor 1132. Output devices 1168 may comprise, for example, one or more visual displays (e.g., computer monitors, VR appliances, and the like), acoustic transducers, such as speakers or microphones, vibration components, and the like. Output devices 1168 may comprise software that interfaces with output devices, for example, visual displays, speakers, microphones, touch sensation devices, smell or taste devices, and the like, that are external to UE 1160.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |

TABLE 1-continued

| Term | Definition |
|---|---|
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |
| MBS | Multicast broadcast service |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a user equipment comprising at least one processor from a radio access network node, a data collection and reporting configuration comprising at least one parameter;

analyzing, by the user equipment, at least one parameter metric, corresponding to the at least one parameter, with respect to at least one parameter criterion to result in at least one analyzed parameter metric, wherein the data collection and reporting configuration comprises the at least one parameter criterion;

based on the at least one analyzed parameter metric being determined to satisfy the at least one parameter criterion, generating, by the user equipment, a parameter report comprising the at least one analyzed parameter metric;

transmitting, by the user equipment to the radio access network node, the parameter report, wherein the data collection and reporting configuration is an initial data collection and reporting configuration; and receiving, by the user equipment, an activating data collection and reporting configuration comprising at least one parameter identifier corresponding to the at least one parameter, indicative that the user equipment is to analyze the at least one parameter metric with respect to the at least one parameter criterion corresponding to the at least one parameter identifier, wherein the user equipment analyzes the at least one parameter metric based on the at least one parameter criterion corresponding to, in the activating data collection and reporting configuration, the at least one parameter identifier and based on the at least one parameter criterion corresponding to the at least one parameter criterion identifier.

2. The method of claim 1, wherein the at least one analyzed parameter metric is sent to the radio access network node to be used by the radio access network node to update a learning model that comprises the at least one parameter.

3. The method of claim 1, wherein the at least one parameter is at least one of: at least one radio performance parameter or at least one non-radio performance parameter.

4. The method of claim 3, wherein the at least one radio performance parameter comprises at least one of: a first parameter applicable to a connection failure; a second parameter representative of a signal-to-noise ratio associated with a signal corresponding to the radio access network node with respect to the user equipment; a third parameter representative of a reference signal received power, a fourth parameter representative of channel quality information; a fifth parameter applicable to a precoding matrix; a sixth parameter applicable to a network resource; a seventh parameter applicable to a network layer, or an eighth parameter applicable to a network transmission rank.

5. The method of claim 3, wherein the at least one non-radio performance parameter comprises at least one of: a processor utilization parameter, a processor temperature parameter, or a buffer capacity parameter.

6. The method of claim 1, wherein the initial data collection and reporting configuration further comprises: at least one parameter identifier associated with the at least one parameter, at least one parameter criterion identifier associated with the at least one parameter criterion, or at least one parameter report format identifier associated with a parameter report format corresponding to the parameter report.

7. The method of claim 6, wherein the user equipment generates the parameter report, according to the parameter report format, comprising the at least one analyzed parameter metric, based on the parameter report format corresponding to the at least one parameter report format identifier.

8. The method of claim 1, wherein the at least one parameter is a first parameter, wherein the at least one parameter metric is a first parameter metric, wherein the at least one parameter criterion is a first parameter criterion, and wherein the at least one analyzed parameter metric is an analyzed first parameter metric, the method further comprising:

analyzing, by the user equipment, a second parameter metric, corresponding to a second parameter of the at least one parameter, with respect to a second parameter criterion of the at least one parameter criterion, to result in an analyzed second parameter metric, wherein the parameter report further comprises the analyzed second parameter metric based on the analyzed second parameter metric being determined to satisfy the second parameter criterion.

9. The method of claim 8, wherein the first parameter is a radio performance parameter and the second parameter is a non-radio performance parameter.

10. The method of claim 1, wherein the initial data collection and reporting configuration is received before establishment of a connection with the radio access network node and wherein the activating data collection and reporting configuration is received after establishment of the connection with the radio access network node.

11. The method of claim 1, wherein the activating data collection and reporting configuration is received during establishment of a connection with the radio access network node.

12. A user equipment, comprising:

at least one processor configured to:

receive, from a radio access network node, a data collection and reporting configuration comprising at least one parameter;

analyze at least one parameter metric, corresponding to the at least one parameter, with respect to at least one parameter criterion, corresponding to the at least one parameter, to result in at least one analyzed parameter metric, wherein the data collection and reporting configuration comprises the at least one parameter criterion, and wherein the at least one parameter corresponds to at least one performance characteristic of the user equipment;

based on the at least one analyzed parameter metric being determined to satisfy the at least one parameter criterion, transmit, to the radio access network node, a parameter report comprising the at least one analyzed parameter metric, wherein the at least one parameter is a first parameter, wherein the at least one parameter criterion is a first parameter criterion, wherein the at least one analyzed parameter metric is an first analyzed parameter metric, wherein the at least one performance characteristic of the user equipment is a first performance characteristic, wherein the data collection and reporting configuration further comprises a second parameter; and analyze a second parameter metric, corresponding to the second parameter, with respect to a second parameter criterion, corresponding to the second parameter, to result in an analyzed second parameter metric, wherein the data collection and reporting configuration comprises the second parameter criterion, wherein the second parameter corresponds to a second performance characteristic of the user equipment, and wherein the transmitting of the parameter report is further based on the second analyzed parameter metric being determined to satisfy the second parameter criterion.

13. The user equipment of claim 12, wherein the at least one performance characteristic corresponds to at least one utilization of the processor.

14. The user equipment of claim 13, wherein the at least one parameter criterion comprises at least one utilization threshold, wherein satisfaction of the at least one parameter criterion comprises the at least one utilization equaling or exceeding the at least one utilization threshold, and wherein the parameter report comprises the at least one utilization.

15. The user equipment of claim 12, wherein the processor is a first component, and wherein the user equipment further comprises:

a second component, wherein the first parameter corresponds to the first component, and wherein the second parameter corresponds to the second component.

16. A non-transitory machine-readable medium, comprising executable instructions that, when executed by a processor of a user equipment, facilitate performance of operations, comprising:

receiving, from a radio access network node, a data collection and reporting configuration comprising at least one event parameter corresponding to at least one event;

analyzing at least one event metric, corresponding to the at least one event parameter, with respect to at least one event parameter criterion to result in at least one analyzed event metric, wherein the data collection and reporting configuration comprises the at least one event parameter criterion;

based on the at least one analyzed event metric being determined to satisfy the at least one event parameter criterion, transmitting, to the radio access network node, a parameter report comprising the at least one analyzed event metric, wherein the data collection and reporting configuration is an initial data collection and reporting configuration; and receiving an activating data collection and reporting configuration comprising at least one event parameter identifier corresponding to the at least one event parameter, indicative that the user equipment is to analyze the at least one event metric with respect to the at least one event parameter criterion corresponding to the at least one event parameter identifier, wherein the analyzing of the at least one event metric is based on the at least one event parameter criterion corresponding to, in the activating data collection and reporting configuration, the at least one event parameter identifier and the at least one event parameter criterion corresponding to the at least one parameter criterion identifier.

17. The non-transitory machine-readable medium of claim 16, wherein the at least one event parameter corresponds to failure of the user equipment to establish a connected state with the radio access network node.

18. The non-transitory machine-readable medium of claim 17, wherein at least one event parameter criterion further comprises a second event parameter criterion corresponding to the at least one event.

19. The non-transitory machine-readable medium of claim 16, wherein the at least one event parameter criterion comprises a first event parameter criterion corresponding to the at least one event.

20. The non-transitory machine-readable medium of claim 16, wherein the at least one event parameter is a radio event parameter, wherein the at least one event metric is a radio event metric, wherein the at least one analyzed event metric is an analyzed radio event metric, wherein the data collection and reporting configuration further comprise at least one non-radio event parameter corresponding to at least one non-radio event, and wherein the operations further comprise:

analyzing at least one non-radio event metric, corresponding to the at least one non-radio event parameter, with respect to at least one non-radio event parameter criterion, to result in at least one analyzed non-radio event metric, wherein the data collection and reporting configuration comprises the at least one non-radio event parameter criterion; and wherein the parameter report further comprises the at least one analyzed non-radio event metric.

* * * * *